United States Patent [19]

Pallo et al.

[11] 4,238,213

[45] Dec. 9, 1980

[54] METHOD OF OPERATION OF A REFRACTORY FIBER PRODUCTION PROCESS

[75] Inventors: John M. Pallo, Englewood; Donald E. Shisler, Littleton, both of Colo.

[73] Assignee: Johns-Manville Corporation, Denver, Colo.

[21] Appl. No.: 27,331

[22] Filed: Apr. 5, 1979

[51] Int. Cl.³ .............................................. C03B 37/04
[52] U.S. Cl. ................................................ 65/8; 65/6
[58] Field of Search .............................. 65/8, 15, 6, 14

[56] References Cited

U.S. PATENT DOCUMENTS

| | | | |
|---|---|---|---|
| 2,388,935 | 11/1945 | Powell | 65/15 |
| 2,428,810 | 10/1947 | Powell | 65/8 |
| 2,520,168 | 8/1950 | Powell | 65/8 |
| 2,520,169 | 8/1950 | Powell | 65/15 |
| 2,561,843 | 7/1951 | Coleman | 65/15 X |
| 2,632,919 | 3/1953 | Koehler | 65/15 X |
| 2,632,920 | 3/1953 | Koehler | 65/8 |
| 2,641,028 | 6/1953 | Steele | 65/15 |
| 2,663,051 | 12/1953 | Graybeal | 65/8 |
| 2,774,103 | 12/1956 | Graybeal | 65/15 |
| 3,045,279 | 7/1962 | Hesse | 65/15 |
| 3,533,769 | 10/1970 | Baier et al. | 65/6 |

Primary Examiner—Robert L. Lindsay, Jr.
Attorney, Agent, or Firm—Robert M. Krone; Joseph J. Kelly; James W. McClain

[57] ABSTRACT

An improved process for the centrifugal spinning of refractory fibers is described. In the improved process rotor circumferential speeds of at least about 21,000 linear feet per minute (6,400 linear meters per minute) are used. In a preferred embodiment the circumferential surfaces of the rotors are also inclined from being perpendicular to the axis of the molten stream, preferably by about 8° to 20°.

5 Claims, 2 Drawing Figures

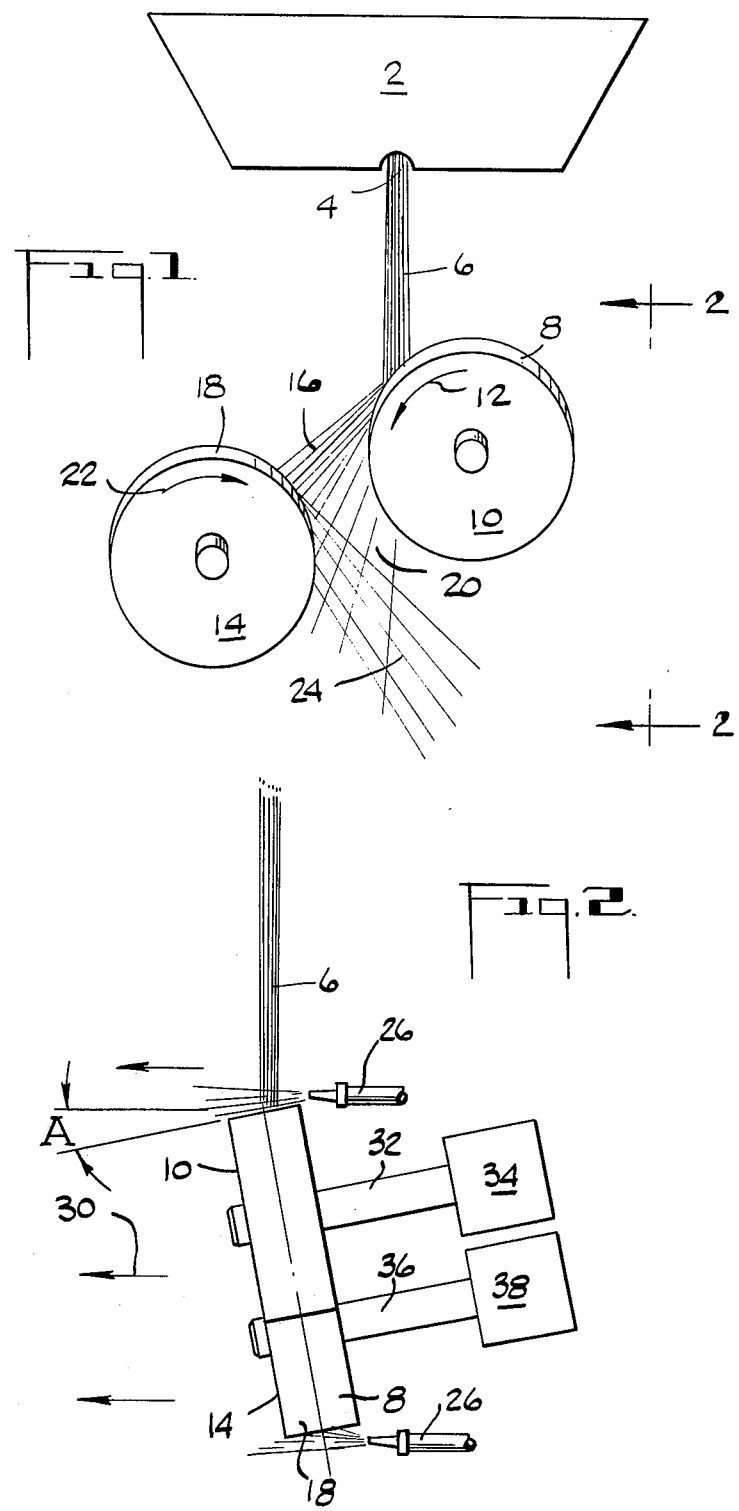

METHOD OF OPERATION OF A REFRACTORY FIBER PRODUCTION PROCESS

TECHNICAL FIELD

The invention herein relates to a process for the formation of refractory fibers and apparatus therefor. More particularly it relates to a process and apparatus for the formation of aluminosilicate fibers from a molten oxide mixture.

BACKGROUND OF THE PRIOR ART

Aluminosilicate refractory fibers are commonly formed by melting a mixture comprising alumina and silica in a furnace and allowing the molten material to flow in a controlled stream from an orifice in the furnace to impinge upon the circumferential surface of one or more rapidly spinning rotors. The molten material initially adheres to the surface of the first rotor which it contacts. The rapid rotation of the rotor, however, causes the molten material to be flung from the surface of the rotor in small portions. Each portion so flung from the surface is either attenuated into a fiber or impinges on and initially adheres to the circumferential surface of another rotor in the rotor set, from which it is subsequently flung for attenuation into a fiber or to impinge again on the first rotor or on yet a third rotor. Normally air or steam is blown across the surface of the rotors in a direction generally parallel to the axis of the rotors. This air or steam flow serves to carry the attenuated fibers away from the vicinity of the rotors for collection into a fiber blanket or mat and to separate fiber "clumps." Any number of rotors may be used in a typical rotor set in order to obtain maximum fiber yield; in a number of installations either two or three rotors are used together. Typical rotor configurations are shown in U.S. Pat. Nos. 2,388,935; 2,428,810; 2,520,168; 2,520,169; 2,632,920; and 3,045,279. (In these patents the rotors are being shown for the purpose of fiberizing mineral wool. The same general type of rotor configurations are used for fiberization of refractory fiber, however.)

It has been known in the past to spin fibers from certain types of igneous rock melts using high rotational speed rotors; see U.S. Pat. No. 3,533,769. However, fiberization of aluminosilicate fiber has always posed different problems than fiberization of materials such as mineral wool fiber, rock wool fiber, glass fiber and the like, because of the nature of the compositions from which each is formed. Materials such as mineral wool fiber, rock wool fiber and glass fiber are formed from mixtures of a large number of inorganic oxides, including silica and alumina. Commonly among the oxides present in such materials are oxides which serve as fluxes. Presence of such fluxes in the fiber composition combined with the lower liquidus temperature ranges of these compositions allows the fibers to be attenuated more effectively and thus results in fibers of very small effective and average diameters.

The aluminosilicate fibers, however, are usually composed essentially entirely of alumina and silica or of alumina and silica plus non-flux oxides such as chromia, calcia and/or magnesia (see, e.g., U.S. Pat. Nos. 3,449,137 and 4,055,434). Such compositions are attenuated much less effectively than are the glass rock and mineral wool fibers, and therefore the fibers obtained are significantly coarser with greater average and effective diameters. Since the finer the individual fibers, the more efficient the resulting fiber blanket or other body is as a thermal insulation, it is desirable to reduce the average and effective fiber diameters of the aluminosilicate fibers to very small values. Various attempts have been made to accomplish this by different means of operation of the rotors, air or steam blowers, or other equipment used in the fiberizing process, but such attempts have resulted in only limited success. Consequently, some refractory fiber manufacturers have incorporated into their aluminosilicate compositions small amounts of fluxes such as soda and boria. While the use of such fluxes has a significant effect on the reduction of the average and effective fiber diameters, it has the disadvantage that the thermal properties of the resulting fibers, such as maximum service temperature, are significantly poorer than the properties of fibers made from mixtures containing essentially only silica and alumina and (if present) the non-flux oxides.

It would therefore be highly desirable to have a process for the production of aluminosilicate refractory fibers which would permit formation of fibers of both essentially aluminosilicate composition and very small fiber diameters. It would also be desirable for the process to result in a lower content of "shot" (unfiberized granules of feed material) in the fiber and also in a smaller particle size for the shot granules which are present.

BRIEF SUMMARY OF THE INVENTION

The invention herein is an improvement in a process for the centrifugal spinning of refractory fibers from a molten stream of mixed oxide materials wherein the stream impinges on the circumferential surface of at least one rotating rotor of a plurality of rotating rotors; the molten mixed oxide material initially adheres to the surface; thereafter portions of the adhered material are flung from the surface by the centrifugal force created by the rotation of said rotor; and each of the portions is thereby attenuated into a fiber or impinges on the circumferential surface of at least one other rotating rotor of the plurality of rotors from which it is subsequently flung by centrifugal force and ultimately thereby attenuated into a fiber. In this invention the improvement comprises rotating each of the rotors at a circumferential speed of at least about 21,000 linear feet per minute (6,400 linear meters per minute). Preferred ranges are from about 24,000 to about 46,000 linear feet per minute (7,300 to 14,000 linear meters per minute). In some embodiments this high speed rotation is conducted while the circumferential surfaces of all of the rotors are inclined from being perpendicular to the axis of the molten stream. The angle of inclination may be very small, but preferably the angle will be at least about 8°, more preferably about 8° to about 20°.

The invention also includes apparatus adapted to perform this improved process and comprising a plurality of rotors each adapted to revolve at a circumferential speed of at least about 21,000 linear feet per minute (6,400 linear meters per minute), preferably from about 24,000 to about 46,000 linear feet per minute (7,300 to 14,000 linear meters per minute). In some embodiments, the circumferential surfaces of all of the rotors are inclined from being perpendicular to the axis of the molten stream. The angle of inclination may be very small, but preferably the angle will be at least about 8°, more preferably about 8° to about 20°.

BRIEF DESCRIPTION OF THE DRAWINGS

FIG. 1 of the drawings is a front view showing a pair of rotors operating in the preferred manner of the present invention.

FIG. 2 is a side view of the rotors of FIG. 1 taken on line 2—2.

DETAILED DESCRIPTION OF THE INVENTION

The invention herein resides in an improvement in an otherwise conventional process for the formation of aluminosilicate refractory fiber. A description of the conventional method of forming fibers by spinning a mixture of molten oxides from the circumferential surfaces of rotors will be found in Kirk-Othmer, "Refractory Fibers," *Encyclopedia of Chemical Technology*, vol. 17 (2d edn., 1968), especially pages 286–288. As briefly illustrated in FIGS. 1 and 2 herein, a composition of mixed oxides in powdered form is melted in furnace 2 by either gas or electric heating. A stream of molten material is released in a controlled fashion from furnace 2 through orifice 4. The stream 6 passes downwardly by gravity and impinges on the circumferential surface 8 of first rotor 10. Initially the molten material adheres to the surface 8 but the rapid spinning motion of rotor 10 (as indicated by the arrow 12) creates sufficient centrifugal force to cause the molten material to be flung off the surface 8 of rotor 10 in small bits or portions. Some of these bits will be flung across to rotor 14 of the rotor pair shown, as indicated at 16, where they will impinge on the circumferential surface 18. Other bits of the molten material will be flung clear of rotor 14 as at 20 and will thus be attenuated into fibers. (Although bits of the molten material are shown being flung from the surface 8 only at 16 and 20, it will be evident that such ejection of bits of material from the surface 8 occurs around the entire circumference of rotor 10.) In a similar manner the centrifugal force generated by the rotation of rotor 14 (as indicated by arrow 22) causes molten bits of material to be flung from the surface 18 and attenuated into fibers as indicated at 24. Once again such ejection occurs around the entire circumference of rotor 14. Some portion of the molten material may be actually flung back against the surface 8 of rotor 10. If there were a third or even a fourth rotor in the set (as shown in some of the aforementioned patents) and the composition had the appropriate melt range characteristics further spinning and attenuation would occur. (The number of rotors present is not critical to this invention. Those skilled in the art will be readily able to select the number of rotors appropriate to a given melt composition.)

The fiberization rotors are contained within a collection chamber and are normally located at one end thereof, in a manner analogous to the arrangements shown in U.S. Pat. Nos. 2,561,843; 2,641,028 and 3,045,279. There is a continuous foraminous belt moving across the bottom of the collection chamber, and a suction box below the belt. The chamber is open to the atmosphere behind the rotors, so that the suction created below the belt draws the spun fibers onto the belt where they form a fibrous bulky body which can be used as is or further processed as by needling, annealing, chopping, etc. A liquid binder or lubricant may also be sprayed on the fibers as they travel through the collection chamber from the rotors to the belt. If desired, fiber collection can be assisted by use of stream jets or air nozzles 26 placed closely adjacent to the surface 18 to push the fibers away from the rotors as they are formed, in the direction indicated by arrows 30.

Thus far the operations described are conventional for centrifugal spinning of refractory fibers. The present invention, however, involves a major improvement on that process, which improvement involves the rotational speed of the rotors 10 and 14 and, in the preferred embodiment, their angle of disposition.

In the improved process of this invention the rotors are operated at a sufficiently high number of revolutions per minute so as to create a circumferential speed of at least about 21,000 linear feet per minute (6,400 linear meters per minute). In a preferred mode the circumferential speed will be in the range of from 24,000 to 46,000 linear feet per minute (7,300 to 1,4000 linear meters per minute), although higher speeds are contemplated. These linear speeds are defined herein for rotors of conventional diameters, i.e., rotors of up to about 15" (38 cm) diameter, usually about 6" to 12" (15 to 30 cm) diameter. At larger diameters problems of rotor integrity become serious. In the past it has been the practice to operate rotors at circumferential speeds not greater than about 17,000 to 18,000 linear feet per minute (5,200 to 5,500 linear meters per minute). It has now been unexpectedly discovered, however, that at the significantly higher circumferential speeds of this process the fibers formed have much finer average and effective diameters. With this improvement fibers that are composed almost entirely of mixtures of alumina and silica (and where desired, the non-flux oxides) can be formed with diameters essentially equal to fiber diameters heretofore obtained only by use of significant amounts of fluxing agents in the composition.

In some embodiments, the invention herein also includes tilting the circumferential surfaces of the rotors away from being perpendicular to the axis of the molten stream 6. The angle of inclination may be very small, but preferably the angle will be at least about 8°, preferably about 8° to 20°. This substantially reduces the amount of molten material which is flung from the circumferential surfaces of the rotors 10 and 14 and hits or passes through the molten stream 6. Observations made using high-speed photography have shown that when portions of the molten material flung from the circumferential surfaces of the rotors 10 and 14 hit the molten stream 6, the flow of the stream is seriously disrupted and some quantities of the molten material in the stream are knocked away from the rotors. These quantities of material which are knocked away from the rotors do not become fiberized but rather solidify as coarse shot granules, which material falls into the collected fiber. The presence of this coarse shot in the fiber is undesirable, for the coarse shot has a detrimental effect on both the feel of the fiber and its thermal properties when used as thermal insulation. Thus by tilting the rotor surfaces away from the stream, both the amount of shot produced and the average coarseness of the shot are reduced (average coarseness reduction occurs because the shot produced by incomplete fiber attenuation is normally less coarse than the shot produced by melt stream disruption).

In the present invention therefore, the circumferential surfaces of the rotors are tilted from being perpendicular to the axis of the molten stream by an angle A. This is most readily accomplished by merely tilting the entire assemblage of rotors, shafts and drive motors. Thus, in FIG. 2, rotor 10 and its associated shaft 32 and drive motor 34 and rotor 14 and its associated shaft 36 and drive motor 38 are all shown tilted at angle A. Angle A may be a very small angle, but preferably it will be at least about 8° to about 20°. Larger angles may be used, but are not preferred, because angles greater than about 20° do not markedly increase the amount of material which is flung clear of melt stream 6 as compared to the amount which clears when angle A is in the range of from about 8° to 20°, and in addition the angles greater than about 20° may have a detrimental effect on the ability of melt stream 6 to impinge satisfactorily on the first circumferential surface 8 and to be retained there. Good results have been observed with a 10° angle of inclination for 8" (20 cm) rotors. The shafts 32 and 36 and other equipment do not need to be angled to exactly the same degree as the circumferential surfaces of the rotors, for universal joints, flexible shafts and the like may be used. Similarly, the rotors 10 and 14 may also have different angles of inclination (or none at all) if the circumferential surfaces are appropriately beveled to obtain a suitable angle A.

For the purposes of this invention the compositions of the oxide mixtures to be melted for fiber formation will be those defined as "predominantly aluminosilicate." This term means that the sum of the alumina and silica contents of the mixture to be melted will be in the range of from 80% to 100%. (Unless otherwise stated herein, all percentages are by weight.) Other oxides such as chromia (U.S. Pat. No. 3,449,137 to Ekdahl) or dolomite or calcium oxide and magnesium oxide (U.S. Pat. No. 4,055,434 to Chen and Pallo) may also be present in amounts of from 0% to 20%. When the additional oxides are non-fluxing, their presence does not materially affect the attenuating characteristics of the fiber, so that the improvement imparted by the process of this invention is essentially equivalent to the improvement imparted to the "substantially aluminosilicate" fiber described below. Further, although it has been noted above that the presence of fluxing oxides is usually considered detrimental, there may be instances where it is desired to have one or more such fluxing oxides in the composition. The present invention is applicable to this situation as well, for where one or more of the additional oxides has some fluxing characteristics, an improvement from the process of this invention will still be obtained in that fibers which were previously of relatively fine diameter utilizing prior art processes can now be manufactured with even finer diameters.

The maximum benefits of the process of this invention are found to be obtained with the conventional "substantially aluminosilicate" fibers. As used herein, this term defines fibers which contain at least 98% of the sum of the alumina and silica contents and not more than 2% of other oxides. For example, in a typical commercial refractory fiber the composition includes 54.5% silica, 45.0% alumina and 0.5% other oxides; fibers of this composition are presently sold by the Johns-Manville Corporation under the trademark "CERAFIBER."

To determine the benefits of the present invention, several experiments were run. The composition used was that mentioned in the preceding paragraph for the commerical "CERAFIBER" fibers. In these tests a pair of rotors was used in a configuration essentially that shown in the drawings but not tilted. The rotors used were of 8" (20 cm) diameter and were turned at a rotational speed sufficient to create circumferential speeds of 17,800, 21,000, and 25,200 linear feet per minute (5,400, 6,400 and 7,700 linear meter per minute, respectively); these speeds corresponded to rotational speeds of 8,500, 10,000 and 12,000 rpm respectively. A sample of fiber generated by each run was collected and the individual fiber diameters of the fibers in each sample were determined. These diameters were then grouped for statistical analysis in 0.5 micrometer increments. The average fiber diameter and effective fiber diameter were then calculated for each sample according to the equations below:

$$\text{Average Fiber Diameter} = \frac{\Sigma(nd)}{\Sigma n}$$

$$\text{Effective Fiber Diameter} = \frac{\Sigma(nd^2)}{\Sigma(nd)}$$

wherein n = the number of fibers in each 0.5 micrometer division d = the representative (i.e., midpoint) diameter of that subdivision Average fiber diameter is the arithmetic average of the fiber sample and is not significantly affected by a few unusually coarse fibers. Effective fiber diameter is significant in thermal conductivity calculations and is based upon the projected cross-sectional area per unit weight of the fibers, assuming the fibers are lying in a plane perpendicular to the heat flow.

The results obtained from these runs are set forth in the Table below.

| Rotor Speed ft/min. | Avg. Fiber Diam., μm | Percent Improvement | Eff. Fiber Diam., μm | Percent Improvement |
| --- | --- | --- | --- | --- |
| 17,800 | 3.3 | (control) | 5.4 | (control) |
| 21,000 | 2.3 | 30% | 3.5 | 35% |
| 25,200 | 2.0 | 40% | 3.0 | 44% |

It will be immediately evident from the data above that the average and effective fiber diameters were both dramatically improved. In the case of the highest rotor speed (25,200 ft/min; 7,700 m/min) the resulting fiber had substantially the same average and effective diameters as a commerical aluminosilicate fiber containing several percent of fluxing materials, which fiber has been found to have an average diameter of 1.9 micrometers and an effective diameter of 2.8 micrometers. This is to be contrasted with the much coarser conventional fiber diameters for the substantially aluminosilicate fibers which are shown by the data for the 17,800 ft/min (5,400 m/min) speed. Higher speeds will produce even finer diameter fibers (although the diameter reduction will not be linear with respect to increased speed.)

The various speeds chosen for operation will to some extent dictate the types of equipment used and the materials which will be suitable for shafts, bearings, drive units, motors, etc. A recent experimental run with 8" (20 cm) rotors operating at 25,200 linear feet per minute (7,700 m/min; 12,000 rpm) forming fibers from a composition of the type described in the aforesaid Ekdahl patent showed that such operation could be sustained on a commerical fiber production furnace for extended periods with no significant deterioration of the apparatus if proper care was taken during manufacture, assembly and operation to insure such factors as precise tolerances of measurements, cleanliness in handling and proper lubrication during operation.

It will be evident that the improved process of the present invention is capable of producing a substantially aluminosilicate fiber with fiber diameters significantly finer than heretofore possible without the addition of adulterating fluxes. The resultant fiber product is of high quality chemically and also has thermal properties equivalent to the prior art flux-containing materials.

STATEMENT OF INDUSTRIAL APPLICATION

The process and apparatus herein are useful in the manufacture of refractory fibers. Such fibers are used as thermal insulation for ovens, furnaces and other devices which operate at service temperatures commonly in the range of about 1200° F. to about 3000° F. (550° C. to 1650° C.).

We claim:

1. In a process for the centrifugal spinning of refractory fibers from a molten stream of predominantely aluminosilicate refractory mixed oxide materials wherein the stream impinges on the circumferential surface of at least one rotating rotor of a plurality of rotating rotors of conventional diameter; the molten mixed oxide material initially adheres to the surface; thereafter portions of the adhered material are flung from the surface by the centrifugal force created by the rotation of said rotor; and each of said portions is thereby attenuated into a fiber or impinges on the circumferential surface of at least one other rotating rotor of said plurality of rotors from which it is subsequently flung by centrifugal force and ultimately thereby attenuated into a fiber, the improvement which comprises rotating all of the rotors at a circumferential speed of at least about 21,000 linear feet per minute.

2. An improvement as in claim 1 wherein said circumferential speed is in the range of from about 24,000 to about 46,000 linear feet per minute.

3. An improvement as in claims 1 or 2 wherein the circumferential surfaces of said rotors are all inclined from being perpendicular to the axis of said molten stream.

4. An improvement as in claim 3 wherein the angle of inclination is at least about 8°.

5. An improvement as in claim 4 wherein said angle is in the rangle of from about 8° to about 20°.

* * * * *